United States Patent
Kimura et al.

(10) Patent No.: US 12,494,689 B2
(45) Date of Patent: Dec. 9, 2025

(54) STATOR INCLUDING FOAMING ADHESIVE AND NON-FOAMING ADHESIVE

(71) Applicant: NISSAN MOTOR CO., LTD., Yokohama (JP)

(72) Inventors: Masahide Kimura, Kanagawa (JP); Tatsuya Imai, Kanagawa (JP); Tomoyasu Hiraoka, Kanagawa (JP); Kazuhiro Hasegawa, Kanagawa (JP); Toshikazu Uchida, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 198 days.

(21) Appl. No.: 18/284,259

(22) PCT Filed: Apr. 2, 2021

(86) PCT No.: PCT/JP2021/014400
§ 371 (c)(1),
(2) Date: Sep. 26, 2023

(87) PCT Pub. No.: WO2022/208892
PCT Pub. Date: Oct. 6, 2022

(65) Prior Publication Data
US 2024/0154485 A1    May 9, 2024

(51) Int. Cl.
*H02K 3/34* (2006.01)
*H02K 3/30* (2006.01)

(52) U.S. Cl.
CPC ............ *H02K 3/345* (2013.01); *H02K 3/30* (2013.01)

(58) Field of Classification Search
CPC .................................. H02K 3/30; H02K 3/345
USPC ........................................................ 310/215
See application file for complete search history.

(56) References Cited

U.S. PATENT DOCUMENTS

| | | | | |
|---|---|---|---|---|
| 2005/0134137 A1* | 6/2005 | Sweo | .................. | H02K 15/023 29/598 |
| 2010/0244615 A1* | 9/2010 | Kouda | ..................... | H02K 3/48 310/215 |
| 2012/0293037 A1* | 11/2012 | Uchida | .................. | H02K 3/487 310/214 |
| 2013/0069474 A1* | 3/2013 | Hamer | ..................... | H02K 3/34 174/110 SR |

(Continued)

FOREIGN PATENT DOCUMENTS

| | | |
|---|---|---|
| JP | 2006-094622 A | 4/2006 |
| JP | 2011-244596 A | 12/2011 |

(Continued)

*Primary Examiner* — Rashad H Johnson
(74) *Attorney, Agent, or Firm* — Foley & Lardner LLP (57) ABSTRACT

A stator including, a stator core having a slot, a winding wire to be inserted into the slot; and an insulation sheet interposed between the slot and the winding wire and configured to electrically insulate an inner wall of the slot and the winding wire, wherein the insulation sheet includes an insulation paper, a first adhesive layer disposed on a front surface of the insulation paper facing the inner wall of the slot, and a second adhesive layer disposed on a back surface of the insulation paper facing the winding wire, a foaming adhesive to be thermally cured while foaming by heating is disposed on the first adhesive layer, and a non-foaming adhesive having lower viscosity than that of the foaming adhesive when unheated is disposed on the second adhesive layer.

8 Claims, 12 Drawing Sheets

(56) References Cited

U.S. PATENT DOCUMENTS

| | | | |
|---|---|---|---|
| 2013/0125396 A1* | 5/2013 | Hamer | H02K 15/105 |
| | | | 29/887 |
| 2013/0300248 A1* | 11/2013 | Ishida | H02K 15/10 |
| | | | 310/214 |
| 2015/0262732 A1* | 9/2015 | Oya | H01B 3/308 |
| | | | 174/110 SR |
| 2016/0380521 A1* | 12/2016 | Tsuchiya | H02K 1/165 |
| | | | 310/215 |
| 2018/0054105 A1* | 2/2018 | Grübel | H02K 15/13 |
| 2018/0134926 A1* | 5/2018 | Lei | B32B 5/22 |
| 2018/0226867 A1* | 8/2018 | Hattori | H02K 15/12 |
| 2019/0280549 A1* | 9/2019 | Inoue | H02K 9/22 |
| 2020/0177057 A1 | 6/2020 | Uryu | |
| 2020/0227987 A1* | 7/2020 | Yamaguchi | H02K 3/345 |
| 2020/0366171 A1* | 11/2020 | Kimura | H02K 15/065 |
| 2021/0036569 A1* | 2/2021 | Koga | H02K 3/12 |
| 2021/0167657 A1* | 6/2021 | Koga | H02K 3/50 |
| 2021/0273514 A1* | 9/2021 | Koga | H02K 15/105 |
| 2021/0384787 A1* | 12/2021 | Okamoto | H02K 3/345 |
| 2022/0029478 A1* | 1/2022 | Takatani | C09J 163/00 |
| 2022/0286007 A1* | 9/2022 | Takahashi | H02K 1/27 |
| 2023/0102696 A1* | 3/2023 | Nakayama | B29C 70/545 |
| | | | 264/46.4 |
| 2023/0113264 A1* | 4/2023 | Takatani | B32B 7/12 |
| | | | 428/344 |
| 2023/0131701 A1* | 4/2023 | Uchiya | C09J 7/35 |
| | | | 442/150 |
| 2023/0183518 A1* | 6/2023 | Takeda | C08G 59/4021 |
| 2023/0364896 A1* | 11/2023 | Miyashita | B32B 27/286 |
| 2023/0421011 A1* | 12/2023 | Shen | H02K 3/38 |
| 2024/0305153 A1* | 9/2024 | Ohzu | H02K 3/345 |
| 2025/0049224 A1* | 2/2025 | Zeng | B32B 5/02 |
| 2025/0129269 A1* | 4/2025 | Hasegawa | B32B 5/20 |

FOREIGN PATENT DOCUMENTS

| | | |
|---|---|---|
| JP | 2012-044831 A | 3/2012 |
| JP | 2013-009499 A | 1/2013 |
| JP | 2020-092482 A | 6/2020 |

* cited by examiner

STATOR INCLUDING FOAMING ADHESIVE AND NON-FOAMING ADHESIVE

TECHNICAL FIELD

The present invention relates to a stator of a rotation electrical machine.

BACKGROUND ART

In a rotation electrical machine such as an electric motor, an insulation sheet is used to insulate a stator and a winding wire. An adhesive such as a resinous adhesive that is in close contact with both the stator and the winding wire is disposed on a front surface of the insulation sheet.

JP2011-244596A discloses a stator in which an insulation sheet having a front surface formed of foamed resin is heated and expanded in a state where the insulation sheet is sandwiched between an inner wall surface of a stator core and a winding wire. With the configuration, the stator and the winding wire can be brought into close contact with each other.

SUMMARY OF INVENTION

Problems to be Solved by the Invention

When foamed resin is used in an insulation sheet as in the related art, resistance when a winding wire is inserted into a slot of a stator is large due to viscosity of the foamed resin, and workability is reduced. If clearance between the slot and the winding wire is increased in order to solve the above, a design of a magnetic circuit including a coil and the stator may be restricted, and heat conductivity between the coil and the stator may also be lowered.

An object of the invention is to provide a technique capable of improving the workability when inserting the winding wire into the stator without lowering the heat conductivity.

Means for Solving the Problem

A stator according to one embodiment of the present is a stator including, a stator core having a slot, a winding wire to be inserted into the slot; and an insulation sheet interposed between the slot and the winding wire and configured to electrically insulate an inner wall of the slot and the winding wire, wherein the insulation sheet includes an insulation paper, a first adhesive layer disposed on a front surface of the insulation paper facing the inner wall of the slot, and a second adhesive layer disposed on a back surface of the insulation paper facing the winding wire, a foaming adhesive to be thermally cured while foaming by heating is disposed on the first adhesive layer, and a non-foaming adhesive having lower viscosity than that of the foaming adhesive when unheated is disposed on the second adhesive layer.

Effect of the Invention

According to the invention, the foaming adhesive is disposed on a surface of the insulation sheet facing the inner wall of the slot, and the non-foaming adhesive having low viscosity is disposed on a surface facing a winding wire side, so that a reduction in the workability when inserting the winding wire into the slot can be suppressed. After assembling, since the winding wire and the slot are brought into close contact with each other by foaming of the foaming adhesive, a decrease in the heat conductivity between the winding wire and the slot can be suppressed.

DESCRIPTION OF EMBODIMENTS

Hereinafter, an embodiment of the invention will be described with reference to the drawings or the like.

Figure 1:
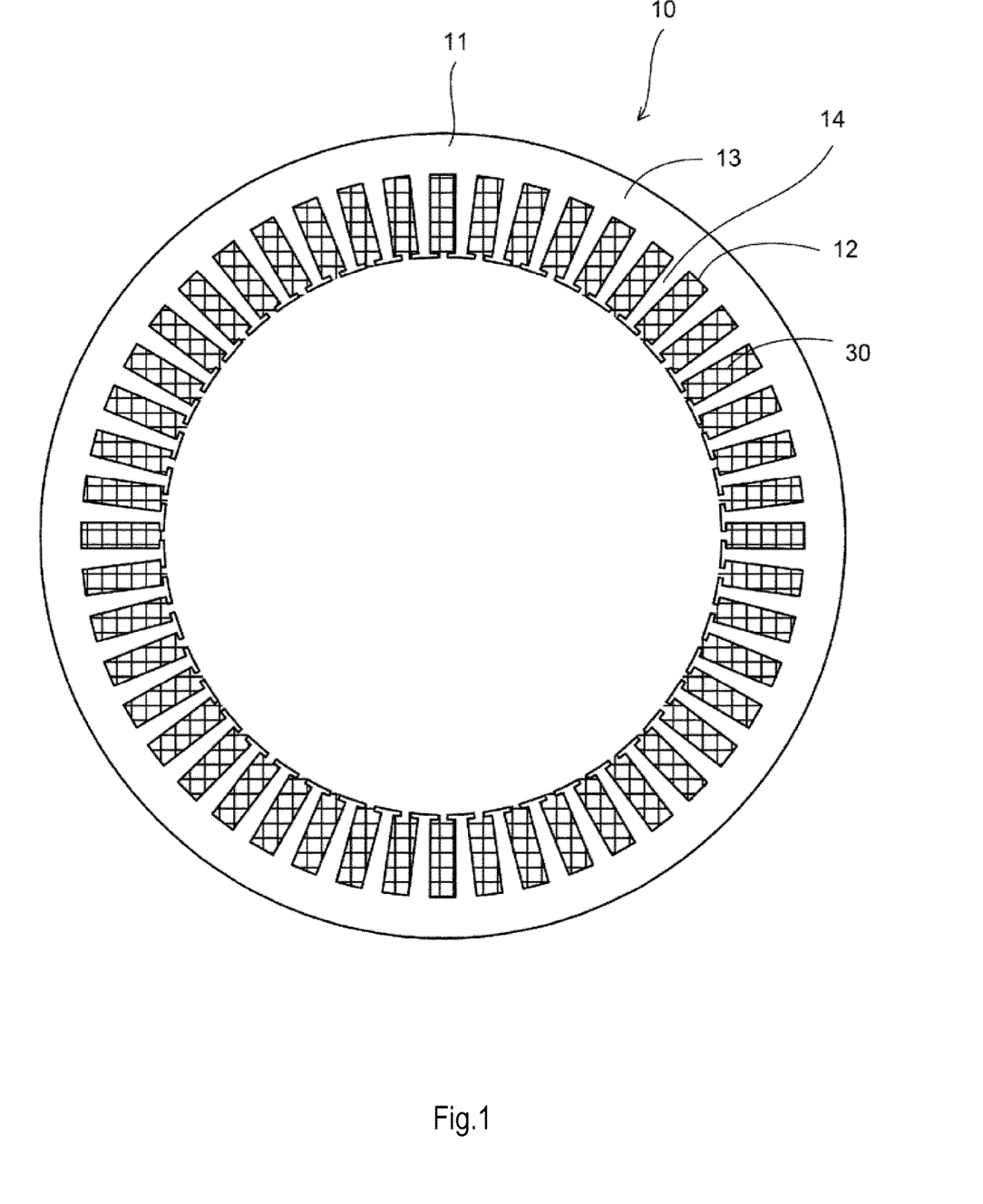
FIG. 1 is a diagram illustrating a stator according to an embodiment of the invention.

FIG. 1 is a diagram illustrating a stator 10 of a motor (rotation electrical machine) to which an insulation sheet according to the embodiment of the invention is applied when the stator 10 is observed from a rotation axis direction.

The stator 10 includes a stator core 11 in which a plurality of slots 12 are formed, winding wires 30 inserted into the slots 12, and insulation sheets 20 (see FIG. 2) electrically insulating the stator core 11 and the winding wires 30.

The stator core 11 is formed by laminating, in the rotation axis direction, electromagnetic steel sheets punched into a circular ring shape. The stator core 11 is formed with a circular ring-shaped back yoke 13 and a plurality of teeth 14 protruding to an inner peripheral side from the back yoke 13.

A void formed between the teeth 14 constitutes the slot 12, and the winding wire 30 (indicated by hatching in FIG. 1) is inserted into the slot 12.

A rotor (not illustrated) is disposed on an inner peripheral side of the stator 10. By passing a current through the winding wires 30 of the stator 10, the rotor rotates due to interaction with permanent magnets provided on the rotor.

Although an example is illustrated in which 48 slots 12 are formed in the stator core 11 illustrated in FIG. 1, the number of the slots 12 is not limited to 48.

The motor according to the present embodiment is mounted on, for example, an electric vehicle and functions as an electric motor that drives wheels. In addition, the motor functions as a generator that performs power generation (regeneration) by receiving a driving force generated by the rotation of the wheels. The motor may be used as a device other than the vehicle, for example, one of driving devices of various electric devices or industrial machines.

Next, a configuration of the slot 12 of the stator 10 will be described.

Figure 2:
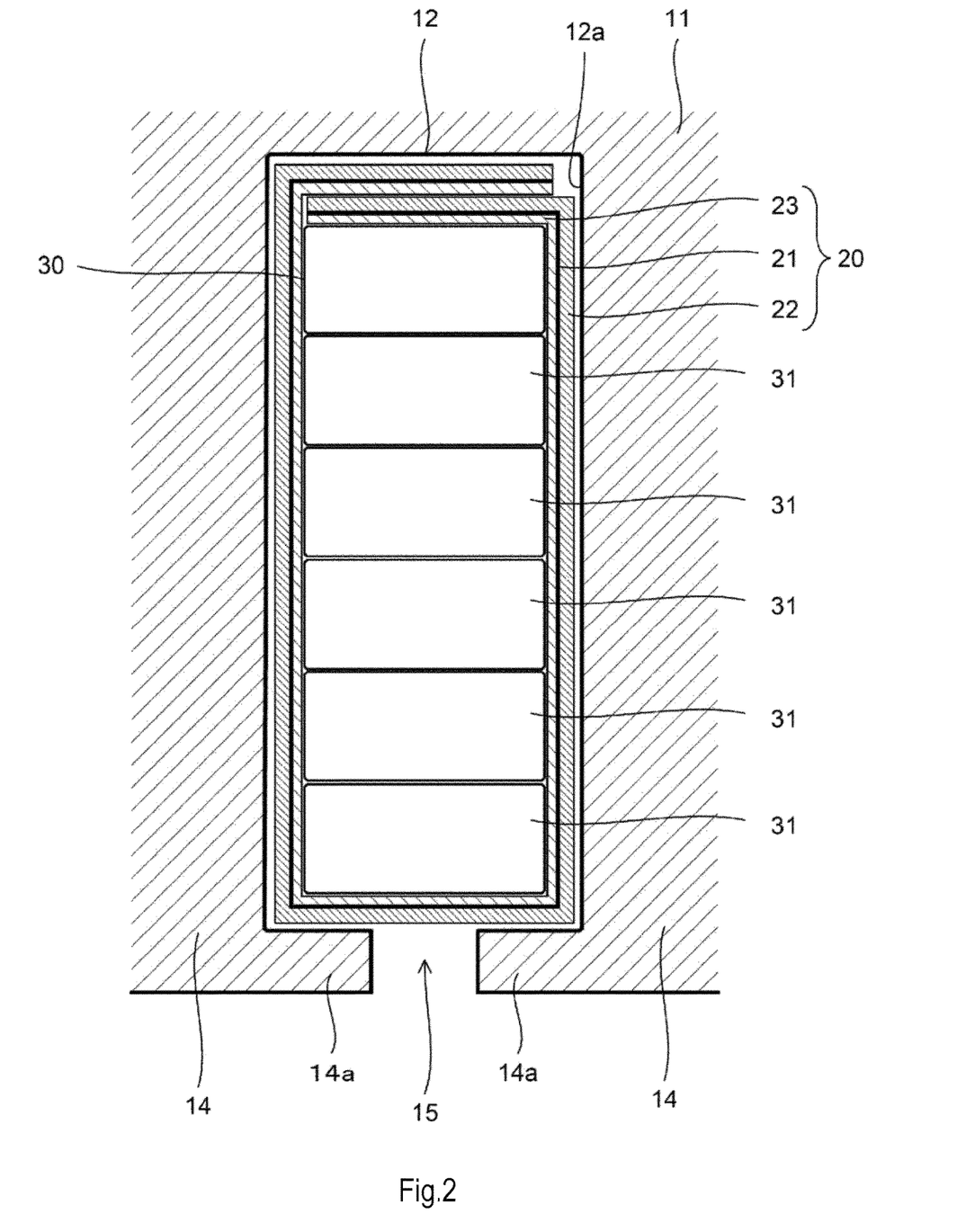
FIG. 2 is an enlarged view of a slot of the stator.

FIG. 2 is a partially enlarged view of the slot 12 of the stator 10 according to the present embodiment. FIG. 2 illustrates one of the plurality of slots 12 illustrated in FIG. 1 as a representative, but configurations of the other slots 12 are the same.

The slot 12 is a gap formed between the teeth 14 in the stator 10. A protrusion portion 14a protruding in a circumferential direction is formed at a tip of the tooth 14, and the slot 12 is opened to the inner peripheral side of the stator 10 from a gap 15 between the protrusion portions 14a.

The winding wire 30 is inserted into the slot 12, and the insulation sheet 20 is interposed between an inner wall 12a of the slot 12 and the winding wire 30.

The insulation sheet 20 electrically insulates the stator core 11 and the winding wire 30. The insulation sheet 20 is provided with a foamable adhesive on a front surface, and the inner wall 12a of the slot 12 and the winding wire 30 are tightly fixed with each other by foaming of the adhesive by heating.

The winding wire 30 includes a plurality of rectangular wires 31 each having an insulation film. In the example illustrated in FIG. 2, six rectangular wires 31 are accommodated in parallel in a radial direction in one slot 12. The number and a shape of the winding wires 30 are not limited thereto.

Next, a configuration of the insulation sheet 20 will be described.

In the related art, a thermosetting adhesive is previously coated to both surfaces of the insulation sheet 20 disposed between the slot 12 and the winding wire 30. After assembling the insulation sheet 20 into the inner wall of the slot 12, the winding wire 30 is inserted, the adhesive is melted by heating and then cured, and the inner wall 12a of the slot 12 and the winding wire 30 are brought into close contact with each other.

Here, when a foaming adhesive whose volume expands due to heat is used such that the slot 12 and the winding wire 30 are brought into close contact with each other, since a surface tackiness is larger than that of a non-foaming adhesive, in a process of assembling the insulation sheet 20 into the slot 12 or in a process of inserting the winding wire 30 into the slot, the insulation sheet 20 may be adhered and workability may be reduced.

If clearance between the inner wall of the slot 12 and the winding wire 30 is increased in order to prevent the above, a distance between the inner wall of the slot 12 and the winding wire 30 is increased, and a design of a magnetic circuit formed by the stator core 11 and the winding wire 30 is restricted. In addition, since heat conductivity from the winding wire 30 to the stator 10 is lowered, a heat treatment is restricted, and as a result, motor efficiency is lowered.

Therefore, in the present embodiment, by configuring the insulation sheet 20 as follows, the workability during assembly is improved without lowering the motor efficiency.

As illustrated in FIG. 2, the insulation sheet 20 is disposed to surround the winding wire 30 over an entire periphery of the inner wall 12a of the slot 12. In a bottom portion located on a radially outer side of the slot 12, a start point and an end point of the insulation sheet 20 are overlapped.

The insulation sheet 20 includes an insulation paper 21, a first adhesive layer 22 provided on a front surface of the insulation paper 21, and a second adhesive layer 23 provided on a back surface of the insulation paper 21. The front surface of the insulation paper 21 is a surface of the insulation sheet 20 on an inner wall 12a side of the slot 12, and the back surface of the insulation paper 21 is a surface of the insulation sheet 20 on a winding wire 30 side.

The insulation paper 21 is formed in a sheet shape by an insulation material made of paper, non-woven fabric, resin, or the like.

The first adhesive layer 22 is coated with a foaming adhesive, which foams by heating and is cured after a volume thereof is expanded, in a predetermined thickness. The second adhesive layer 23 is coated with a non-foaming adhesive, which is cured by heating without foaming, in a predetermined thickness.

The foaming adhesive is configured such that, for example, a minute binder that foams by heat is dispersed and mixed in an adhesive, the binder foams when the foaming adhesive is melted by heating, and a volume (thickness) thereof increases. The foaming adhesive is cured while maintaining a thickness thereof by further heating.

The non-foaming adhesive does not contain a foamable material. The non-foaming adhesive is melted by heating, and is cured with little change in volume (thickness). The non-foaming adhesive is configured such that surface viscosity in an unheated state is lower than that of the foaming adhesive.

A curing temperature of the non-foaming adhesive is set to be equal to or higher than a curing temperature of the foaming adhesive. The foaming adhesive is made of, for example, urethane resin. The non-foaming adhesive is made of, for example, epoxy resin.

Next, an assembling method of the stator 10 configured as described above will be described.

Figure 3:
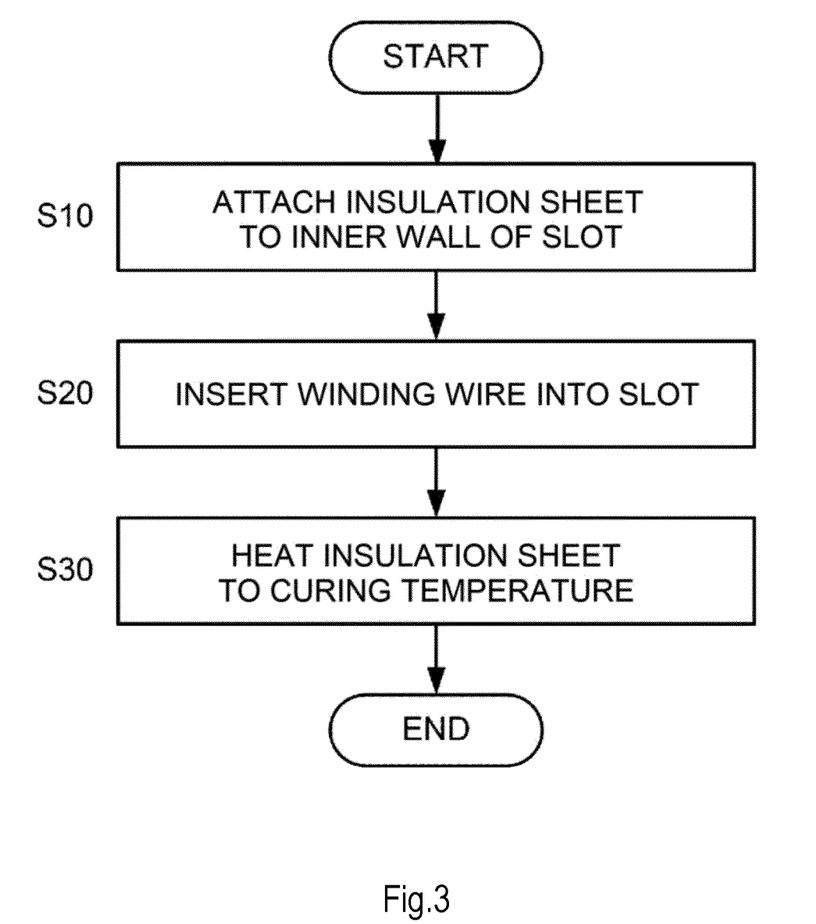
FIG. 3 is a flowchart of an assembling method of the stator.

FIG. 3 is a flowchart illustrating the assembling method of the stator 10 using the insulation sheet 20 according to the present embodiment.

First, in step S10, the insulation sheet 20 is attached to all the slots 12 of the stator core 11. For example, a first front surface of the insulation sheet 20 is brought into close contact with the inner wall 12a of the slot 12 by a jig or the like.

The front surface of the insulation paper 21 is the first adhesive layer 22 entirely coated with the foaming adhesive having high viscosity, and the insulation sheet 20 can be easily brought into close contact with the inner wall 12a of the slot 12. In addition, since the second adhesive layer 23 on the back surface of the insulation paper 21 is entirely coated with the non-foaming adhesive having low viscosity, the non-foaming adhesive does not adhere to a hand of an operator or the jig during work, and does not interfere with the work.

Next, in step S20, the winding wire 30 is inserted into each slot 12.

The winding wire 30 includes a plurality of rectangular wires 31 having a U-shape. The rectangular wire 31 is inserted in an axial direction of the slot 12 from an open end. At this time, the inner wall 12a of the slot 12 and the insulation sheet 20 are in close contact with each other by the foaming adhesive having high viscosity. In addition, since the non-foaming adhesive having low viscosity is disposed on the winding wire 30 side, the insulation sheet 20 is less likely to shift when the winding wire 30 is inserted.

Next, in step S30, the insulation sheet 20 attached to the slot 12 is heated to the curing temperature.

For example, after putting the entire stator 10 into a furnace and heating the insulation sheet 20 to the curing temperature, the insulation sheet 20 is kept at the curing temperature for a predetermined time until the foaming adhesive and the non-foaming adhesive are fully cured.

Figure 4:
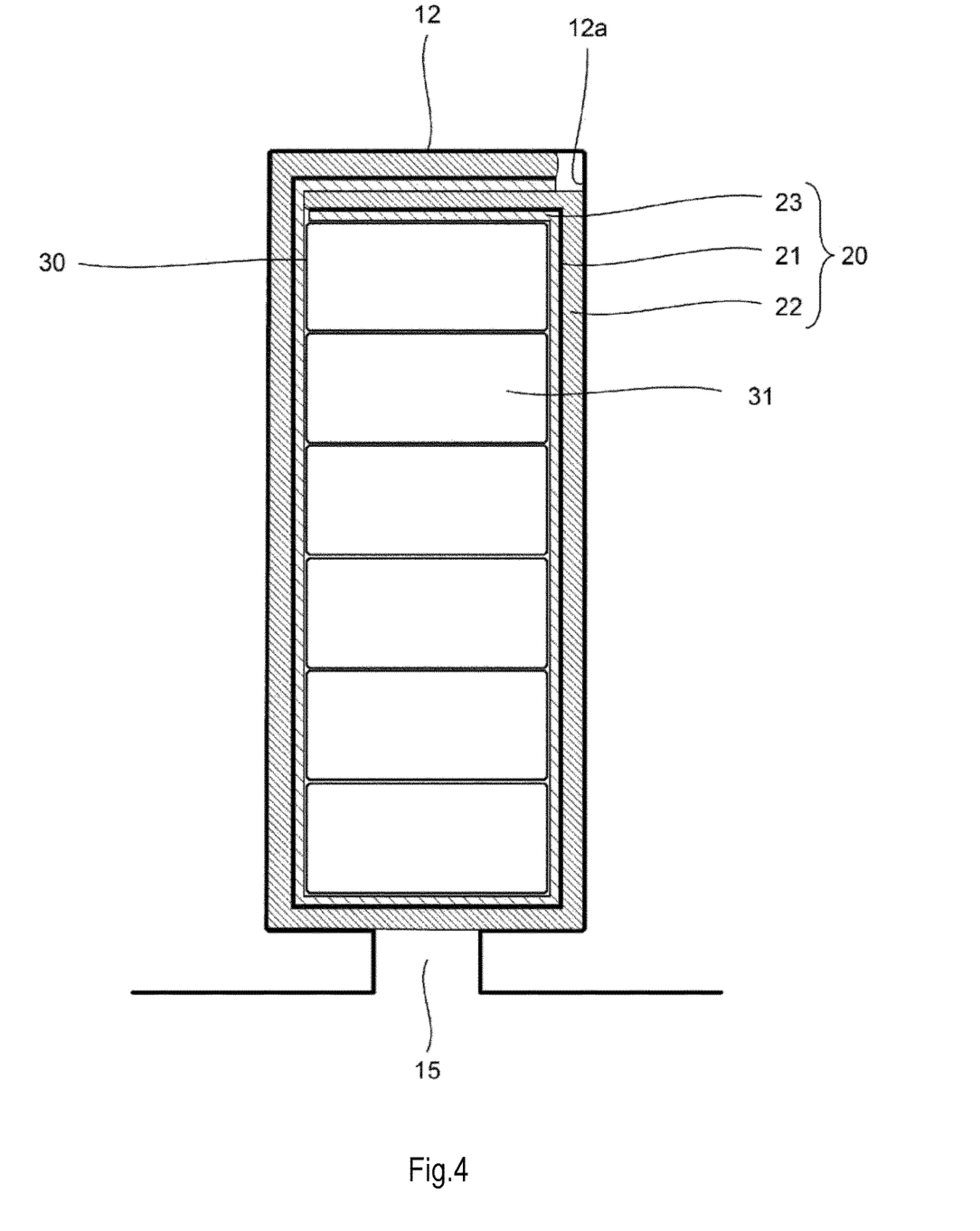
FIG. 4 is an enlarged view of a slot of a stator according to a modification.

In the process in step S30, first, the foaming adhesive is melted by the temperature rise. The foaming adhesive foams by melting to increase the volume thereof. Accordingly, as illustrated in FIG. 4, the thickness of the foaming adhesive increases, and the void between the inner wall 12a of the slot 12 and the winding wire 30 is filled. Thereafter, the foaming adhesive is cured while maintaining the thickness. At the same time, or after the foaming adhesive is cured, the non-foaming adhesive is melted and cured.

According to such a treatment, a thickness of the first adhesive layer is increased by the foaming of the foaming adhesive disposed on the first adhesive layer 22, the void between the inner wall 12a of the slot 12 and the winding wire 30 is filled, and the winding wire 30 is fixed in the slot 12.

As described above, the stator 10 according to the present embodiment includes the stator core 11 including the slots 12, the winding wires 30 inserted into the slots 12, and the insulation sheets 20 interposed between the slot 12 and the winding wire 30 and electrically insulating the inner wall 12a of the slot 12 and the winding wire 30. The insulation sheet 20 includes the insulation paper 21, the first adhesive layer 22 disposed on the front surface of the insulation paper 21 facing the inner wall 12a of the slot 12, and the second adhesive layer 23 disposed on the back surface of the insulation paper 21 facing the winding wire 30. The foaming adhesive that is thermally cured while foaming by heating is disposed on the first adhesive layer 22, and the non-foaming adhesive that has lower viscosity than that of a first adhesive when unheated is disposed on the second adhesive layer 23.

According to such a configuration, in the insulation sheet 20, the foaming adhesive is disposed on the front surface facing the inner wall 12a of the slot 12 and the non-foaming adhesive having low viscosity is disposed on the back surface facing the winding wire 30 side, so that insertion resistance of the winding wire 30 when the winding wire 30 is inserted into the slot 12 is reduced, and a reduction in the workability due to shift of the insulation sheet 20 or the like can be suppressed. In addition, after the assembling, the thickness of the insulation sheet 20 is increased by the foaming of the foaming adhesive by heating and the winding wire 30 and the slot 12 are brought in close contact with each other, so that a decrease in the heat conductivity between the stator core 11 and the winding wire 30 can be suppressed. Further, the clearance between the slot 12 and the winding wire 30 can be minimized, and the design of the magnetic circuit including the slot 12 and the winding wire 30 is not restricted. Accordingly, the motor efficiency can be improved.

In the present embodiment, in the insulation sheet 20, the foaming adhesive is disposed on the whole first adhesive layer 22, and the non-foaming adhesive is disposed on the whole second adhesive layer 23.

According to such a configuration, by disposing the insulation sheet 20 around the winding wire 30, the winding wire 30 can be brought into more close contact with the inner wall 12a of the slot 12 by the foaming adhesive.

In the present embodiment, the curing temperature of the non-foaming adhesive is equal to or higher (the same or higher) than the curing temperature of the foaming adhesive. According to such a configuration, the foaming adhesive and the non-foaming adhesive are cured after the foaming adhesive foams and the thickness thereof increases, so that the void between the inner wall 12a of the slot 12 and the winding wire 30 is filled, and the winding wire 30 is fixed in the slot 12.

Next, modifications of the present embodiment will be described.

As described above, in the present embodiment, it is sufficient that at least the foaming adhesive is disposed on the surface of the insulation sheet 20 on the inner wall 12a side of the slot 12, and at least the non-foaming adhesive is disposed on the surface of the insulation sheet 20 on the winding wire 30 side, and the following modification may be adopted.

Figure 5:
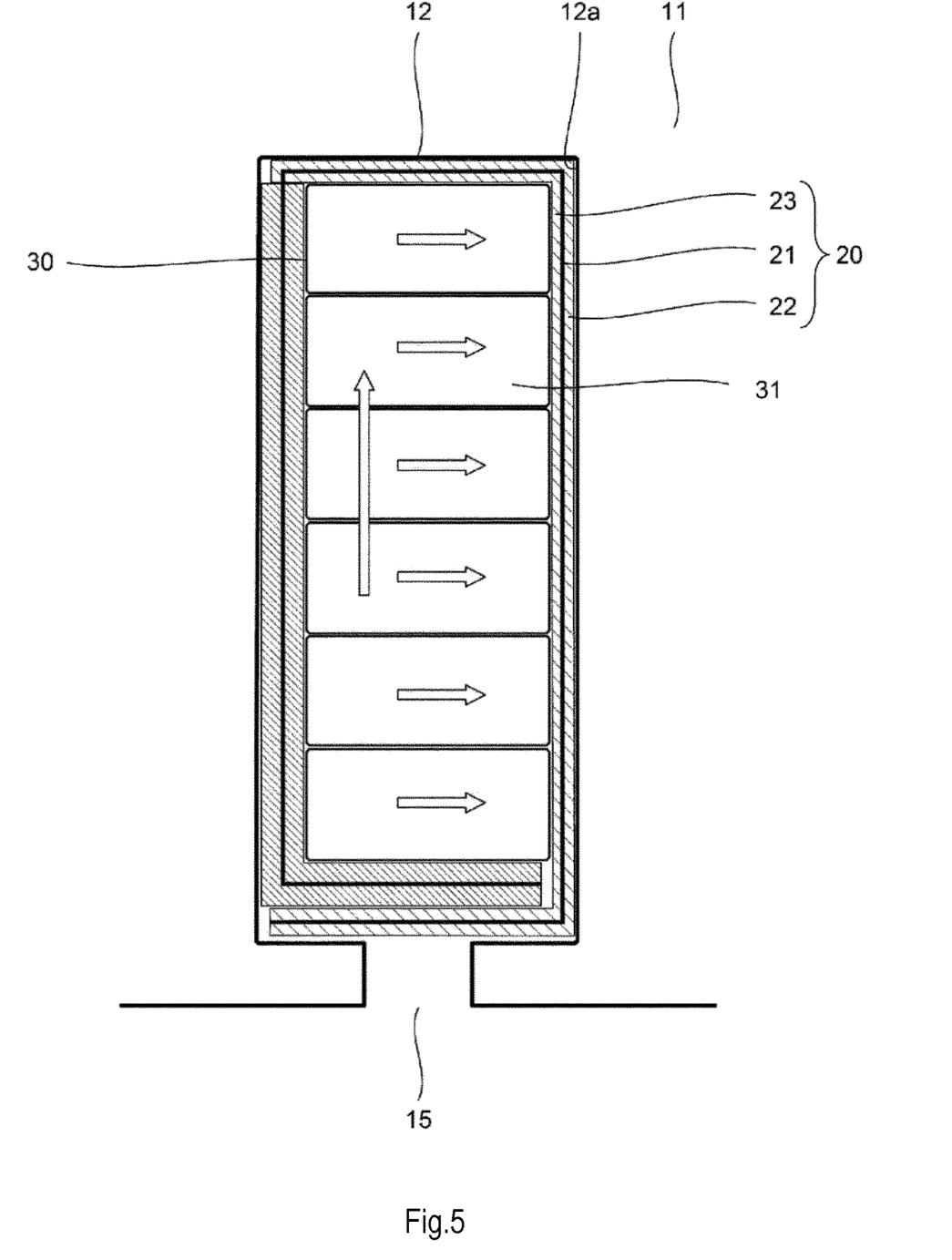
FIG. 5 is an enlarged view of a slot of a stator according to a modification.

FIG. 5 is a partially enlarged view of the slot 12 according to a modification of the present embodiment.

In an example illustrated in FIG. 5, the foaming adhesive is disposed on the first adhesive layer 22 and the second adhesive layer 23 on one surface of two surfaces facing each other in a state where the insulation sheet 20 is disposed in the slot 12. The non-foaming adhesive is disposed on the first adhesive layer 22 and the second adhesive layer 23 on the other surface.

More specifically, in the inner wall 12a of the slot 12, the foaming adhesive is disposed on an entire left side in FIG. 5, and the non-foaming adhesive is disposed on an entire right side in FIG. 5 facing the entire left side. In addition, in the inner wall 12a of the slot 12, the foaming adhesive is disposed on an entire inner side surface of the slot 12 near the gap 15, and the non-foaming adhesive is disposed on an entire outer side surface on a back side in a radial direction of the stator 10. A start point and an end point of the insulation sheet 20 are overlapped near the gap 15 of the slot 12.

When such a stator is heated, a thickness of the foaming adhesive increases, the winding wire 30 is pressed in directions indicated by outlined arrows in FIG. 5, moved to a vicinity of the inner wall 12a of the slot 12 and fixed, so that the winding wire 30 and the inner wall 12a of the slot 12 can be reliably brought into close contact with each other through the insulation sheet 20.

Figure 6:
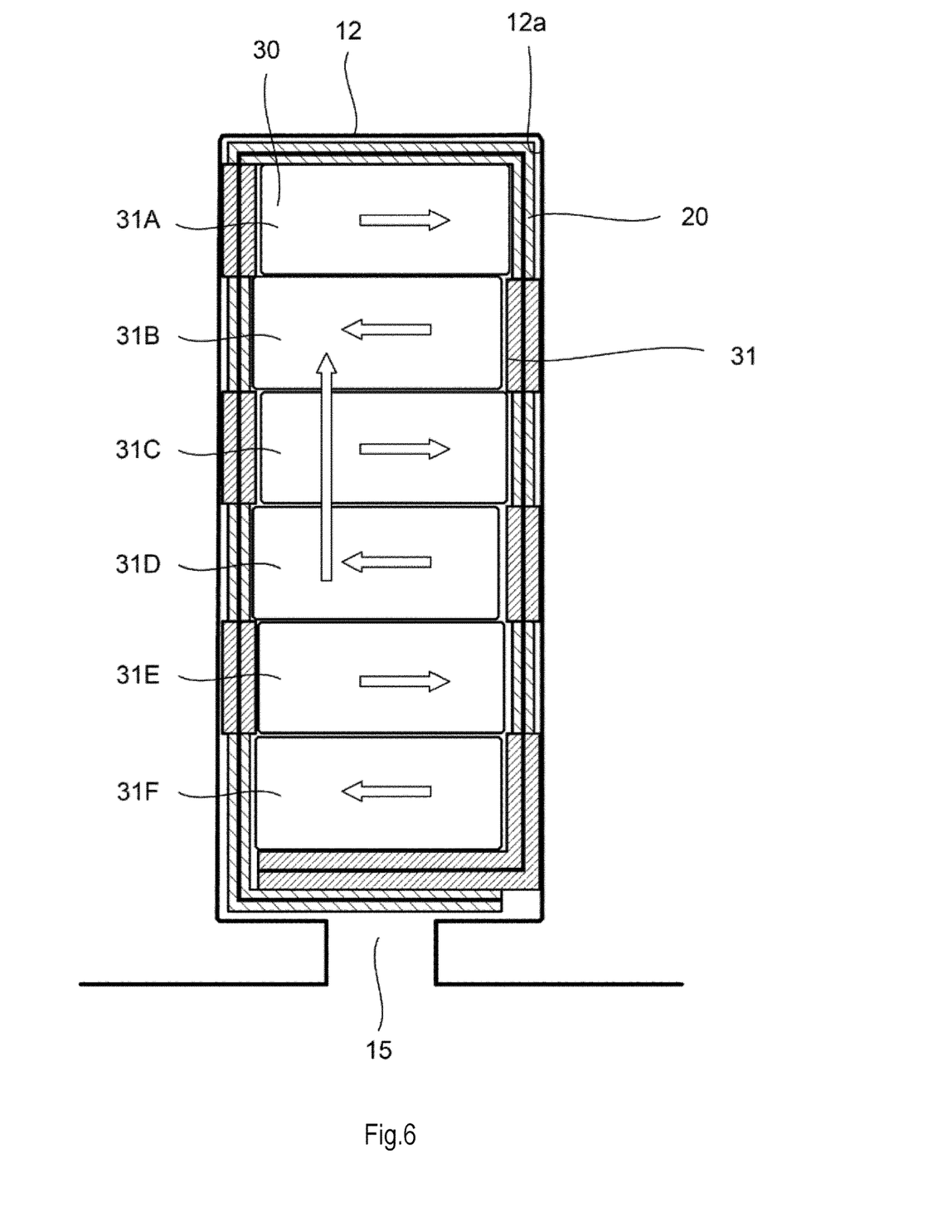
FIG. 6 is an enlarged view of a slot of a stator according to a modification.

FIG. 6 is a partially enlarged view of the slot 12 according to another modification of the present embodiment.

In an example illustrated in FIG. 6, for each of the rectangular wires 31 that constitute the winding wire 30, adhesives disposed on the first adhesive layer 22 and the second adhesive layer 23 of the insulation sheet 20 facing each other with the rectangular wire 31 sandwiched therebetween are different from each other.

In FIG. 6, the winding wire 30 includes six rectangular wires 31 (31A, 31B, 31C, 31D, 31E, 31F) arranged in a row in the radial direction.

In the rectangular wire 31A among the rectangular wires 31, the foaming adhesive is disposed on the first adhesive layer 22 and the second adhesive layer 23 of the insulation sheet 20 facing one side surface (left side in FIG. 6) of the slot 12, and the non-foaming adhesive is disposed on the first adhesive layer 22 and the second adhesive layer 23 of the insulation sheet 20 facing the other side surface (right side in FIG. 6).

In another rectangular wire 31B adjacent to the rectangular wire 31A in the radial direction, the arrangement of the foaming adhesive and the non-foaming adhesive is different from that of the rectangular wire 31A. That is, in the another rectangular wire 31B, the non-foaming adhesive is disposed on the first adhesive layer 22 and the second adhesive layer 23 of the insulation sheet 20 facing the one side surface (left side in FIG. 6), and the foaming adhesive is disposed on the first adhesive layer 22 and the second adhesive layer 23 of the insulation sheet 20 facing the other side surface (right side in FIG. 6).

In this way, for each of the rectangular wires 31, the foaming adhesive and the non-foaming adhesive on the first adhesive layer 22 and the second adhesive layer 23 of the insulation sheet 20 facing each other with the rectangular wire 31 sandwiched therebetween are different, and for the plurality of rectangular wires 31 adjacent in the radial direction, the foaming adhesive and the non-foaming adhesive are disposed alternately in the radial direction. In addition, in the radial direction of the slot 12, the foaming adhesive and the non-foaming adhesive on the first adhesive layer 22 and the second adhesive layer 23 of the insulation sheet 20 facing each other with the plurality of rectangular wires 31 arranged in a row sandwiched therebetween are also disposed alternately.

According to such a configuration, when a thickness of the foaming adhesive is increased by heating, the rectangular wires 31 are alternately pressed in directions indicated by outlined arrows in FIG. 6, moved to a vicinity of the inner wall 12a of the slot 12 and fixed, so that the winding wires 30 and the inner wall 12a of the slot 12 can be reliably brought into close contact with each other through the insulation sheet 20.

Figure 7:
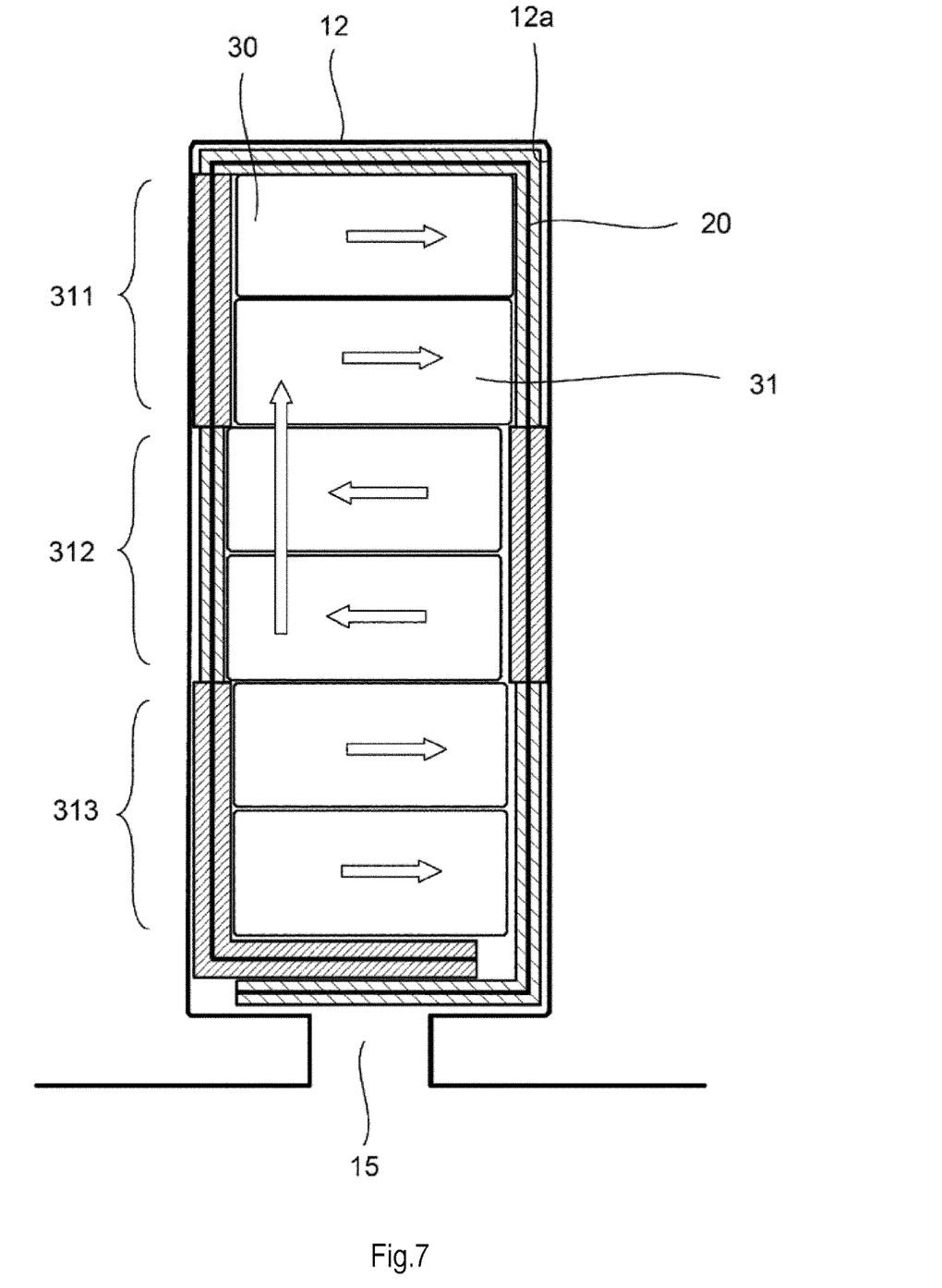
FIG. 7 is an enlarged view of a slot of a stator according to a modification.

FIG. 7 is a partially enlarged view of the slot 12 according to still another modification of the present embodiment.

The modification illustrated in FIG. 7 is similar to the modification illustrated in FIG. 6, a plurality of rectangular wires 31 are set as one group, and an adhesive disposed on the first adhesive layer 22 and the second adhesive layer 23 of the insulation sheet 20 changes for each group.

As illustrated in FIG. 7, the insulation sheet 20 (both sides of the inner wall 12a) at positions facing two rectangular wires 31 on the back side in the radial direction among the rectangular wires 31 of the winding wire 30 is set as a first group 311. Similarly, the insulation sheet 20 (both sides of the inner wall 12a) at positions facing two rectangular wires 31 at positions adjacent to the first group 311 is set as a second group 312. Similarly, the insulation sheet 20 (both sides of the inner wall 12a) at positions facing two rectangular wires 31 on the radially outer side is set as a third group 313.

In the first group 311, the foaming adhesive is disposed on the first adhesive layer 22 and the second adhesive layer 23 of the insulation sheet 20 facing one side surface (left side in FIG. 7), and the non-foaming adhesive is disposed on the first adhesive layer 22 and the second adhesive layer 23 of the insulation sheet 20 facing the other side surface (right side in FIG. 7).

In the second group 312 adjacent to the first group 311, the arrangement of the foaming adhesive and the non-foaming adhesive is made different. That is, in the second group 312, the non-foaming adhesive is disposed on the first adhesive layer 22 and the second adhesive layer 23 of the insulation sheet 20 facing the one side surface (left side in FIG. 7), and the foaming adhesive is disposed on the first adhesive layer 22 and the second adhesive layer 23 of the insulation sheet 20 facing the other side surface (right side in FIG. 7). Similarly, in the third group 313 adjacent to the second group 312, the arrangement of the foaming adhesive and the non-foaming adhesive is made different from that of the second group 312. In addition, in the radial direction of the slot 12, the foaming adhesive and the non-foaming adhesive on the first adhesive layer 22 and the second adhesive layer 23 of the insulation sheet 20 facing each other with the plurality of rectangular wires 31 arranged in a row sandwiched therebetween are also disposed alternatively.

In such a configuration, when a thickness of the foaming adhesive is increased by heating, the rectangular wires 31 arranged in each group are also alternately pressed in directions indicated by outlined arrows in FIG. 7, moved to a vicinity of the inner wall 12a of the slot 12 and fixed, so that the winding wire 30 and the inner wall 12a of the slot 12 can be reliably brought into close contact with each other through the insulation sheet 20.

Figure 8:
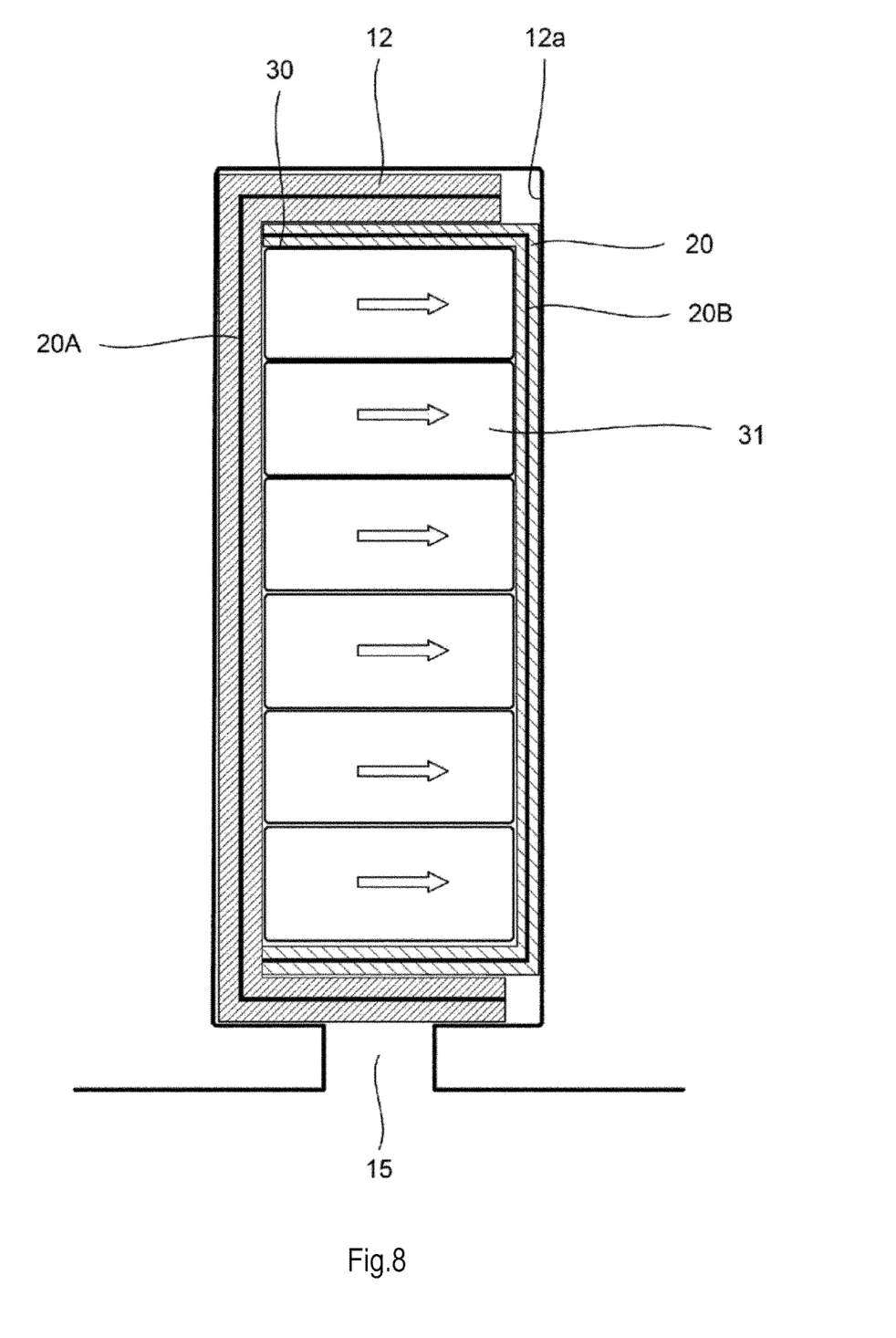
FIG. 8 is an enlarged view of a slot of a stator according to a modification.

FIG. 8 is a partially enlarged view of the slot 12 according to still another modification of the present embodiment.

In the modification illustrated in FIG. 8, the insulation sheet 20 includes a plurality of insulation sheets (first insulation sheet 20A and second insulation sheet 20B).

As illustrated in FIG. 8, on one side surface (left side in FIG. 8) of the slot 12, the first insulation sheet 20A in which the foaming adhesive is disposed on the first adhesive layer 22 and the second adhesive layer 23 is inserted. On the other side surface (right side in FIG. 8) of the slot 12, the second insulation sheet 20B in which the non-foaming adhesive is disposed on the first adhesive layer 22 and the second adhesive layer 23 is inserted.

The first insulation sheet 20A and the second insulation sheet 20B are overlapped with each other at a bottom surface on the back side in the radial direction of the slot 12 and the gap 15 on a front side in the radial direction, and in the overlapped portion, the second insulation sheet 20B is disposed on a winding wire 30 side.

In such a configuration, in particular, the first insulation sheet 20A on which only the foaming adhesive is disposed and the second insulation sheet 20B on which only the non-foaming adhesive is disposed are configured as separate parts, so that a treatment for forming the first adhesive layer 22 and the second adhesive layer 23 in the insulation sheets 20A and 20B is simplified, and a manufacturing cost of the insulation sheet 20 can be suppressed.

Further, as in the modification illustrated in FIG. 5 described above, when a thickness of the foaming adhesive of the first insulation sheet 20A is increased by heating, the winding wire 30 is pressed in a direction indicated by outlined arrows in FIG. 8, moved to a vicinity of the inner wall 12a of the slot 12 and fixed, so that the winding wire 30 and the inner wall 12a of the slot 12 can be reliably brought into close contact with each other through the insulation sheet 20.

In the modification illustrated in FIG. 8, the first insulation sheet 20A and the second insulation sheet 20B are overlapped with each other at the bottom surface on the back side in the radial direction of the slot 12 and the gap 15 on the front side in the radial direction, but the invention is not limited to the above, the first insulation sheet 20A and the second insulation sheet 20B may be disposed so as to overlap at other positions.

Figure 9:
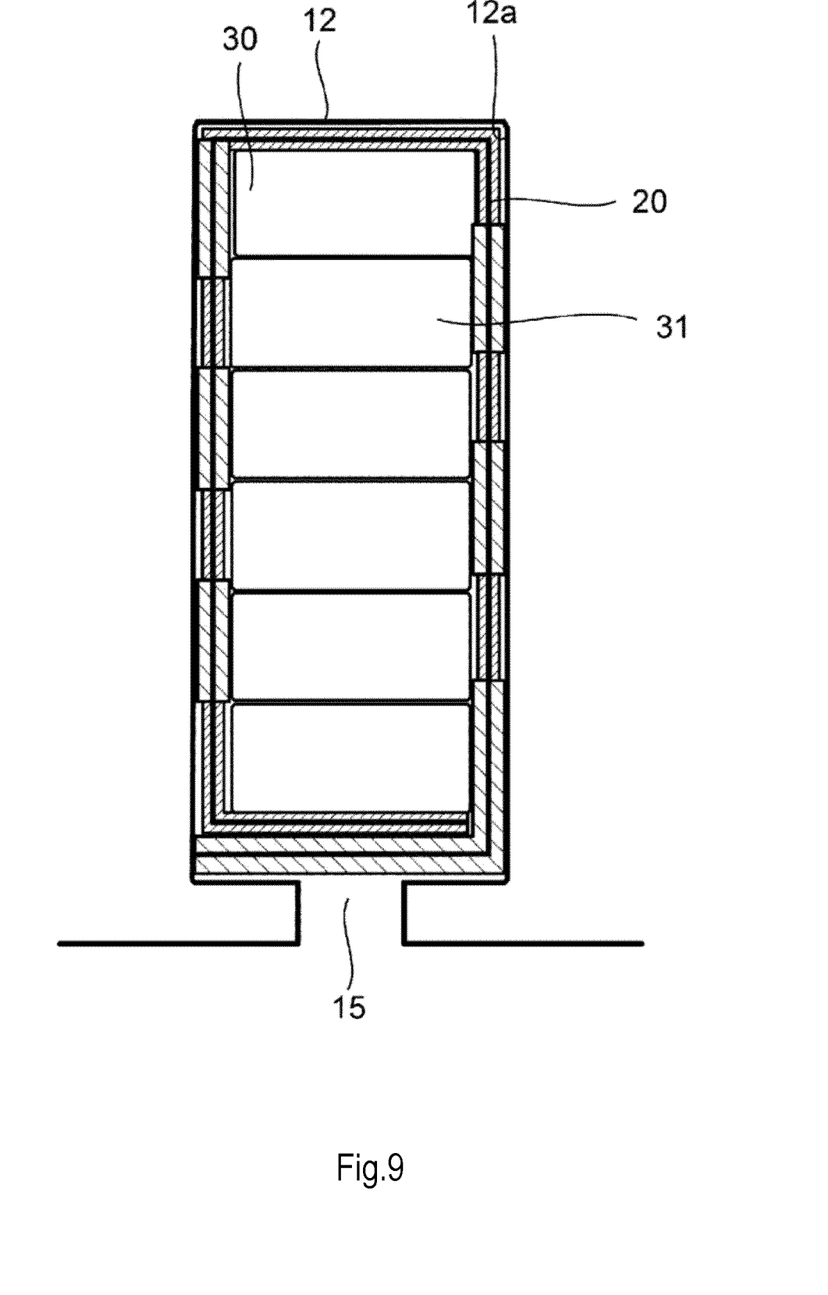
FIG. 9 is an enlarged view of a slot of a stator according to a modification.
Figure 10:
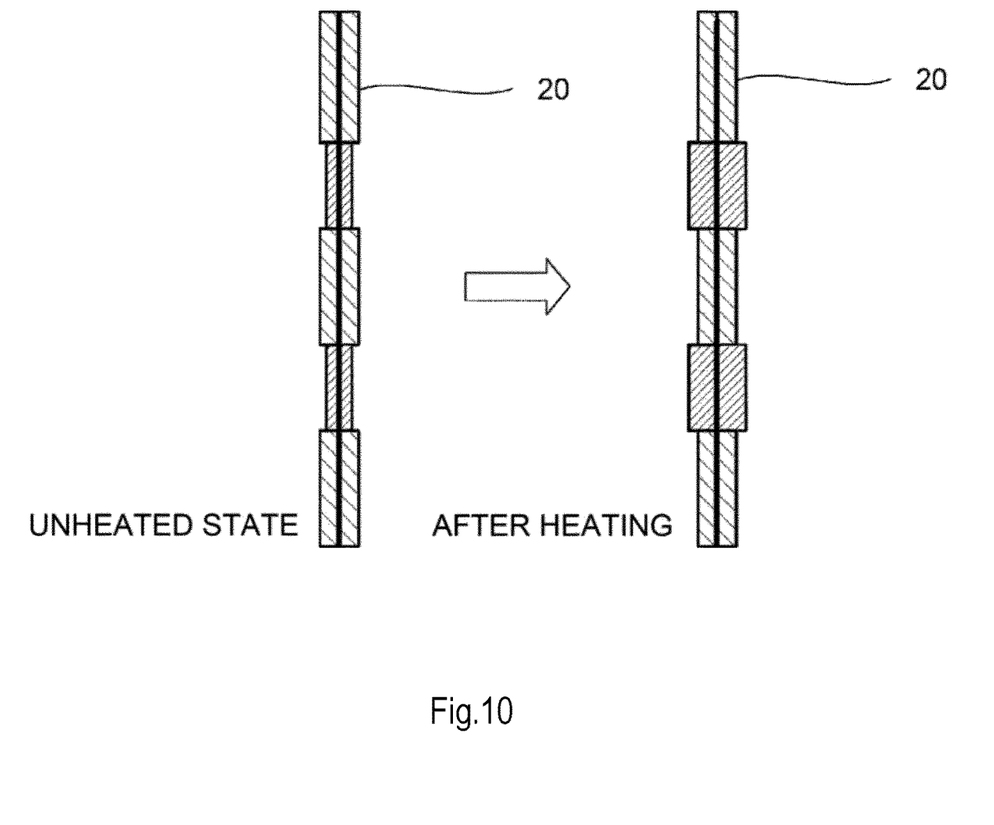
FIG. 10 is a diagram illustrating an insulation sheet of a modification.

FIG. 9 is a partially enlarged view of the slot 12 according to yet another modification of the present embodiment, and FIG. 10 is a diagram illustrating the insulation sheet 20 before and after heating.

In the modification illustrated in FIG. 9, as in the modification illustrated in FIG. 7, a foaming adhesive or a non-foaming adhesive is disposed on each of the first adhesive layer 22 and the second adhesive layer 23 of the insulation sheet 20, and positions thereof are dispersedly (randomly) disposed at positions unrelated to positions of the rectangular wires 31 of the winding wire 30.

Further, a thickness of a place on the insulation sheet 20 to which the foaming adhesive is coated is smaller when unheated and increased after heating to a curing temperature, as compared with a thickness of a place to which the non-foaming adhesive is coated.

As illustrated in FIG. 10, when not heated, the thickness of the place on the insulation sheet 20 to which the foaming adhesive is coated is smaller than the thickness of the place to which the non-foaming adhesive is coated. According to the configuration, when the winding wire 30 is inserted (step S20 in FIG. 3), since the winding wire 30 does not touch the foaming adhesive on the insulation sheet 20, the winding wire 30 does not adhere to the foaming adhesive, and the insulation sheet 20 fixed to the inner wall 12a of the slot 12 is less likely to shift.

Further, when a thickness of the foaming adhesive is increased by heating, the winding wire 30 is pressed at the place on which the foaming adhesive is disposed, and the inner wall 12a of the slot 12 and the winding wire 30 can be reliably fixed through the insulation sheet 20.

Figure 11:
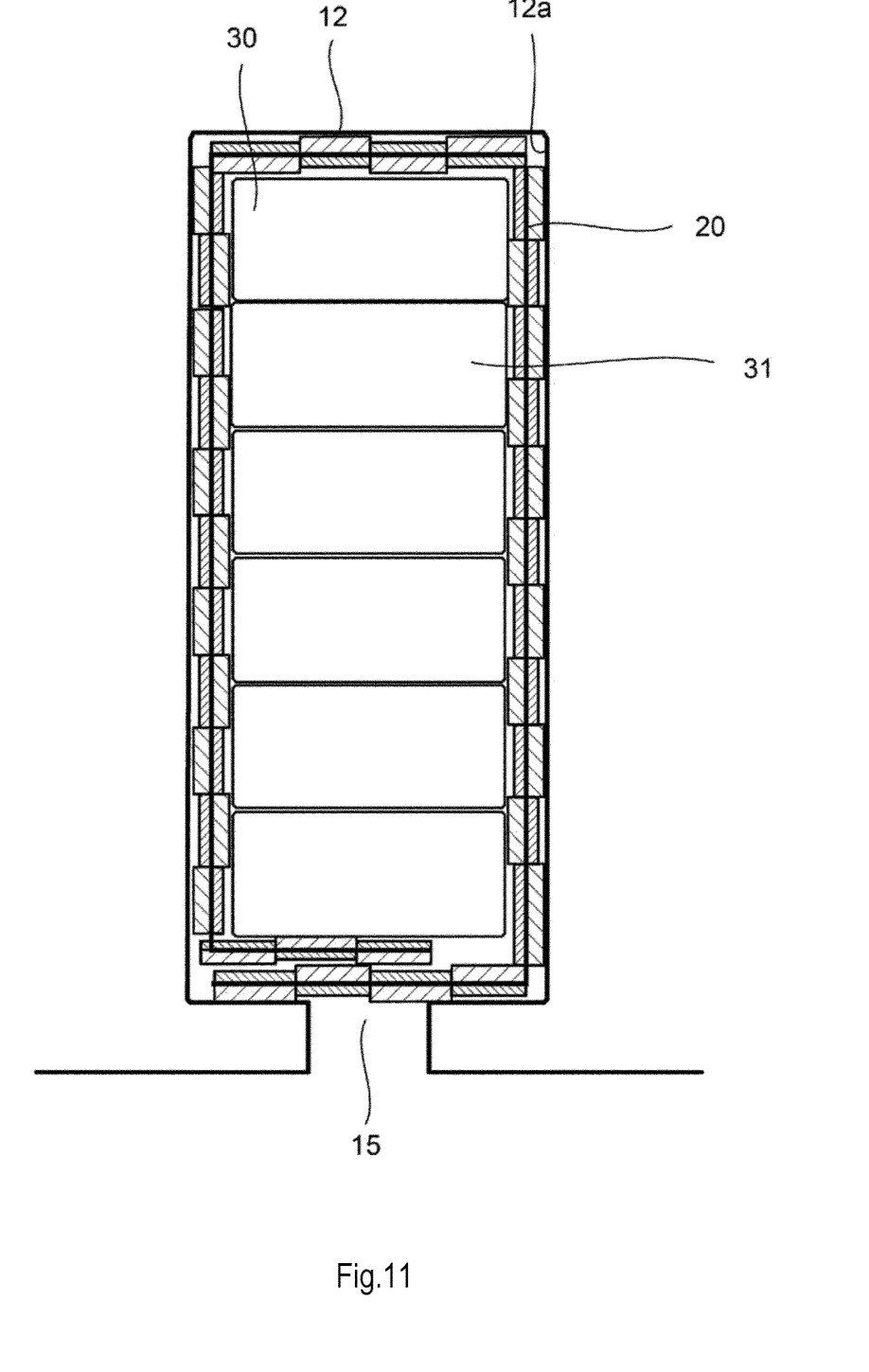
FIG. 11 is an enlarged view of a slot of a stator according to a modification.

FIG. 11 is a partially enlarged view of the slot 12 according to yet another modification of the present embodiment.

In the modification illustrated in FIG. 11, as in the modification illustrated in FIG. 9, the foaming adhesive and the non-foaming adhesive on the insulation sheet 20 are disposed at positions unrelated to positions of the rectangular wires 31 of the winding wire 30 (randomly). Then, a thickness of a place on the insulation sheet 20 to which the foaming adhesive is coated is smaller when unheated and increased after heating to a curing temperature, as compared with a thickness of a place to which the non-foaming adhesive is coated.

Further, an adhesive disposed on the first adhesive layer 22 and an adhesive disposed on the second adhesive layer 23 of the insulation sheet 20 at corresponding positions on front and back sides are made different. That is, at a certain place of the insulation sheet 20, the foaming adhesive is disposed on the first adhesive layer 22, and the non-foaming adhesive is disposed on the second adhesive layer 23 on the back side. At another place, the non-foaming adhesive is disposed on the first adhesive layer 22, and the foaming adhesive is disposed on the second adhesive layer 23 on the back side.

According to such a configuration, as in the modification illustrated in FIG. 9, when the winding wire 30 is inserted, the winding wire 30 does not touch the foaming adhesive on the insulation sheet 20, so that the winding wire 30 does not adhere to the foaming adhesive either, and the insulation sheet 20 fixed to the inner wall 12a of the slot 12 is less likely to shift. In addition, when a thickness of the foaming adhesive is increased by heating, the winding wire 30 is pressed at the place on which the foaming adhesive is disposed, and the inner wall 12a of the slot 12 and the winding wire 30 can be reliably fixed through the insulation sheet 20.

Figure 12A:
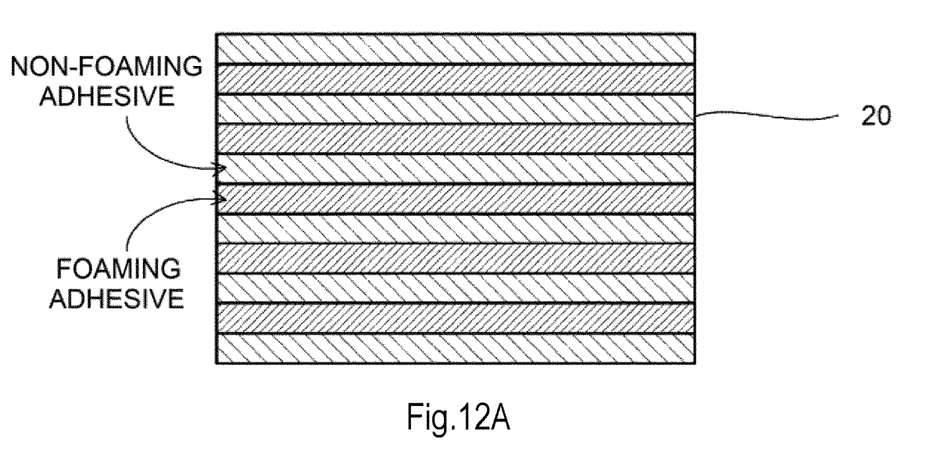
FIG. 12A is a diagram illustrating an insulation sheet according to the modification.
Figure 12B:
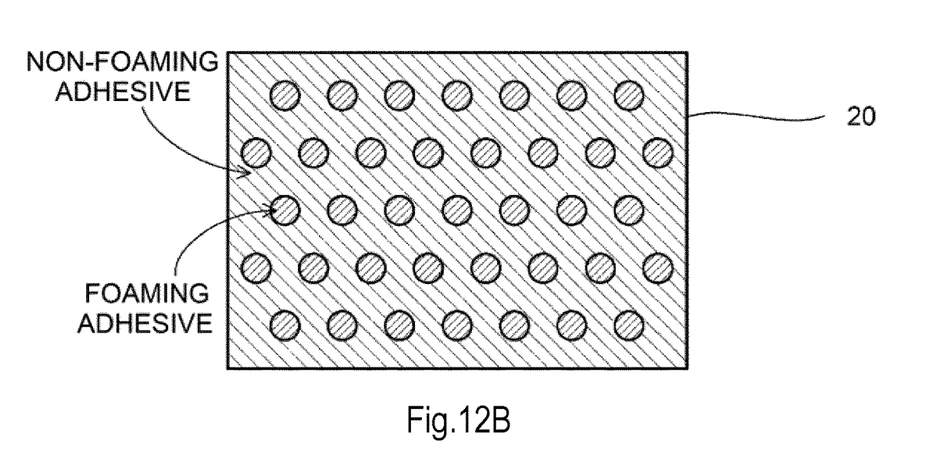
FIG. 12B is a diagram illustrating the insulation sheet according to the modification.
Figure 12C:
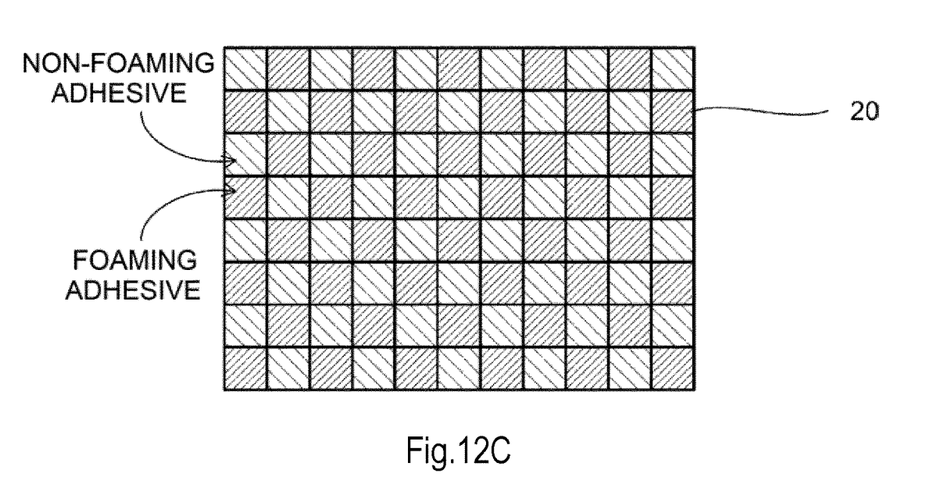
FIG. 12C is a diagram illustrating the insulation sheet according to the modification.

FIGS. 12A, 12B, and 12C are diagrams illustrating examples of arrangement of the foaming adhesive and the non-foaming adhesive on the insulation sheet 20 in the modification illustrated in FIG. 11.

FIGS. 12A, 12B, and 12C illustrate the first adhesive layer 22 disposed on a front surface of the insulation sheet 20. In the second adhesive layer 23 disposed on a back surface of the insulation sheet 20, the positions of the foaming adhesive and the non-foaming adhesive are opposite to the arrangement illustrated in FIGS. 12A, 12B, and 12C.

FIG. 12A illustrates an example in which the foaming adhesive and the non-foaming adhesive are alternately disposed in a belt shape.

FIG. 12B illustrates an example in which circular foaming adhesives are dispersedly disposed on the non-foaming adhesive.

FIG. 12C illustrates an example in which the foaming adhesive and the non-foaming adhesive are alternately arranged in a lattice shape.

In any case, the thickness of the place on the insulation sheet 20 to which the foaming adhesive is coated is set smaller than the thickness of the place to which the non-foaming adhesive is coated.

In this way, by disposing the foaming adhesive and the non-foaming adhesive on the insulation sheet 20, a degree of freedom in forming the first adhesive layer 22 and the second adhesive layer 23 on the insulation sheet 20 increases, and a manufacturing cost of the insulation sheet 20 can be suppressed.

Although the embodiment and the modifications of the invention have been described above, the above embodiment and modifications are merely a part of application examples of the invention, and do not mean that the technical scope of the invention is limited to the specific configurations of the above embodiment. The embodiment described above has been described as a single embodiment, but may be appropriately combined.

The invention claimed is:

1. A stator comprising:
   a stator core including a slot;
   a winding wire to be inserted into the slot; and
   an insulation sheet interposed between the slot and the winding wire and configured to electrically insulate an inner wall of the slot and the winding wire, wherein
   the insulation sheet includes an insulation paper, a first adhesive layer disposed on an entire front surface of the insulation paper facing the inner wall of the slot, and a second adhesive layer disposed on an entire back surface of the insulation paper facing the winding wire,
   a foaming adhesive that is thermally cured while foaming by heating is disposed on the first adhesive layer, and
   a non-foaming adhesive that has lower viscosity than that of the foaming adhesive when unheated and does not foam by heating is disposed on the second adhesive layer, and the non-foaming adhesive is thermally cured at a temperature higher than a temperature at which the foaming adhesive is thermally cured while foaming.

2. The stator according to claim 1, wherein
   in the insulation sheet, the foaming adhesive is disposed on the first adhesive layer entirely, and the non-foaming adhesive is disposed on the second adhesive layer entirely.

3. The stator according to claim 1, wherein
   in the insulation sheet, the foaming adhesive and the non-foaming adhesive are dispersedly disposed on the first adhesive layer and the second adhesive layer.

4. The stator according to claim 3, wherein
   the insulation sheet is formed such that, when unheated, a thickness of a place on which the foaming adhesive is disposed is smaller than a thickness of a place on which the non-foaming adhesive is disposed.

5. A stator comprising:
   a stator core having a slot;
   a winding wire to be inserted into the slot; and
   an insulation sheet interposed between the slot and the winding wire and configured to electrically insulate an inner wall of the slot and the winding wire, wherein
   the insulation sheet includes an insulation paper and adhesive layers, among two surfaces facing each other in the slot, a foaming adhesive that is thermally cured while foaming by heating is disposed on adhesive layers on front and back surfaces of the insulation paper on one surface, a non-foaming adhesive that has lower viscosity than that of the foaming adhesive when unheated and does not foam by heating is disposed on adhesive layers on front and back surfaces of the insulation paper on the other surface, and the non-foaming adhesive is thermally cured at a temperature higher than a temperature at which the foaming adhesive is thermally cured while foaming.

6. The stator according to claim 5, wherein the winding wire includes a plurality of rectangular wires arranged in a row in a radial direction of the stator in the slot, and in the insulation sheet, in at least one of the plurality of rectangular wires, the foaming adhesive and the non-foaming adhesive are respectively disposed on adhesive layers on front and back surfaces of the insulation paper facing each other with the one rectangular wire sandwiched therebetween, and the arrangement of the foaming adhesive and the non-foaming adhesive is different from that of another rectangular wire adjacent to the one rectangular wire in the radial direction.

7. A stator comprising:

a stator core having a slot;

a winding wire to be inserted into the slot; and an insulation sheet interposed between the slot and the winding wire and configured to electrically insulate an inner wall of the slot and the winding wire, wherein the insulation sheet includes an insulation paper and adhesive layers, and includes a first insulation sheet in contact with one side surface of the inner wall of the slot, and a second insulation sheet in contact with the other side surface of the inner wall of the slot, in the inner wall of the slot, and a foaming adhesive that is thermally cured while foaming by heating is disposed on adhesive layers on front and back surfaces of an insulation paper of the first insulation sheet, a non-foaming adhesive that has lower viscosity than that of the foaming adhesive when unheated and does not foam by heating is disposed on adhesive layers on front and back surfaces of an insulation paper of the second insulation sheet, and the non-foaming adhesive is thermally cured at a temperature higher than a temperature at which the foaming adhesive is thermally cured while foaming.

8. A stator comprising:

a stator core having a slot;

a winding wire to be inserted into the slot; and an insulation sheet interposed between the slot and the winding wire and configured to electrically insulate an inner wall of the slot and the winding wire, wherein the insulation sheet includes an insulation paper, a first adhesive layer disposed on an entire front surface of the insulation paper facing the inner wall of the slot, and a second adhesive layer disposed on an entire back surface of the insulation paper facing the winding wire, a foaming adhesive that has viscosity to come into close contact with the inner wall of the slot when unheated and is thermally cured while foaming by heating is disposed on the first adhesive layer, and a non-foaming adhesive that has lower viscosity than that of the foaming adhesive when unheated so as not to come into close contact with the inner wall of the slot and does not foam by heating is disposed on the second adhesive layer, and the non-foaming adhesive is thermally cured at a temperature higher than a temperature at which the foaming adhesive is thermally cured while foaming.

* * * * *